(No Model.)
R. OTTEN.
BOTTLING MACHINE.
No. 252,894. Patented Jan. 31, 1882.
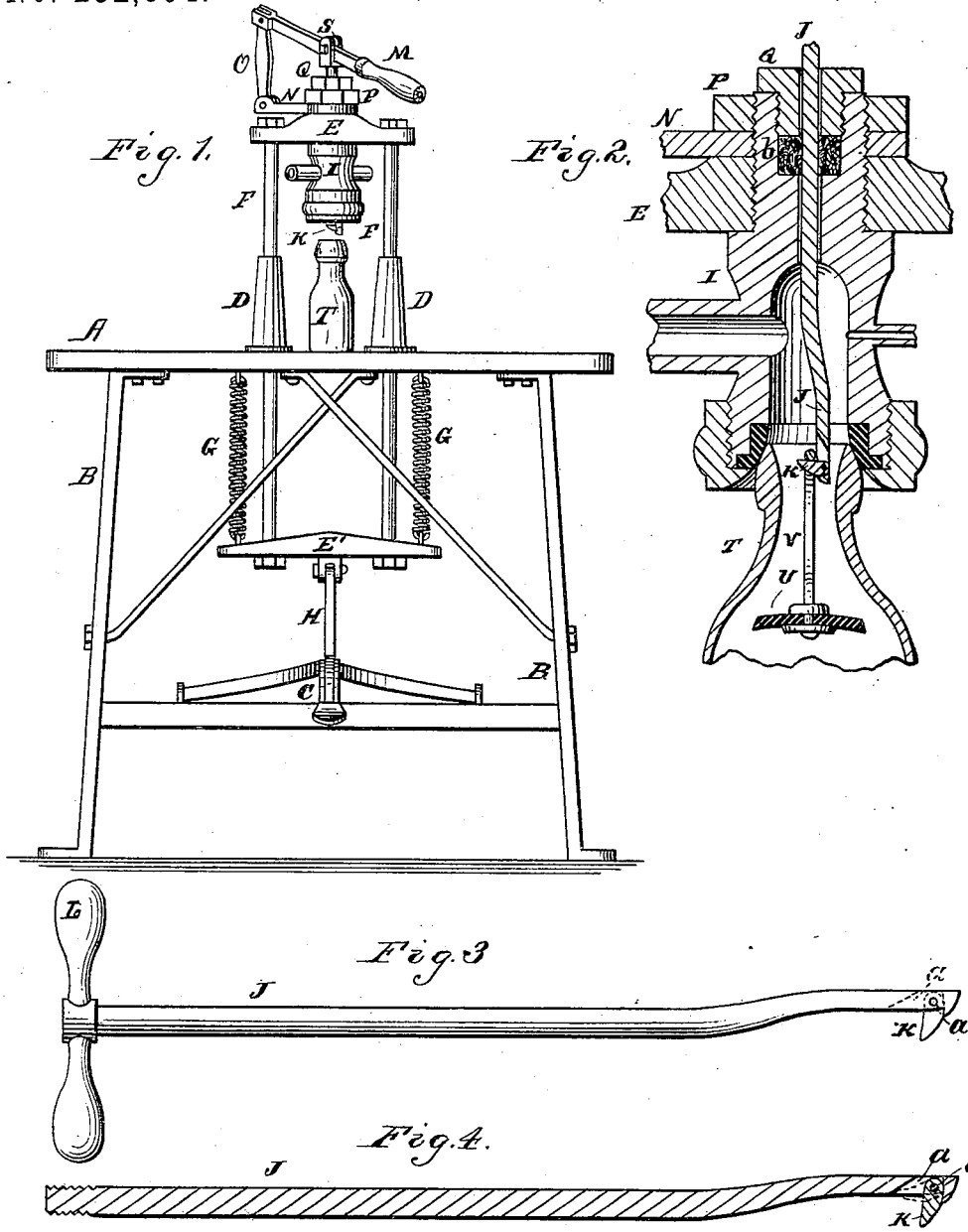
Witnesses
Henry Frankfurter,
Caleb Brinton,
Inventor,
Richard Otten
per. F. F. Warner, his
Attorney.

UNITED STATES PATENT OFFICE.

RICHARD OTTEN, OF CHICAGO, ILLINOIS.

BOTTLING-MACHINE.

SPECIFICATION forming part of Letters Patent No. 252,894, dated January 31, 1882.

Application filed May 25, 1881. (No model.)

*To all whom it may concern:*

Be it known that I, RICHARD OTTEN, of Chicago, in the county of Cook and State of Illinois, have invented certain new and useful Improvements in Bottling-Machines, of which the following, in connection with the accompanying drawings, is a specification.

In the drawings, Figure 1 is a front elevation of a bottling-machine embodying my invention. Fig. 2 is a vertical central view of the filling head or cylinder and the plunger and the parts supporting the said head. Fig. 3 is a side view of the plunger, and Fig. 4 is a central longitudinal section thereof.

Like letters of reference indicate like parts.

My invention relates to the construction of the plunger; and it consists in certain novel features of construction employed for adapting the plunger for engaging the loop or eye of internal bottle-stoppers, as will hereinafter more fully appear.

A is the bench or table, and B is its supporting-frame.

C is a treadle.

D D are hollow posts or standards on the table A.

E and E' are cross bars, and F F are rods passing freely through the posts D D and through the table, and connecting the bars E and E' firmly together, the latter of the said bars being below and the former above the table, as shown. The bar E may also be termed a "cross-head."

G G are closed spiral springs depending from the under side of the table, and connected at their lower ends to the bar E'.

H is a connecting-rod, hinged to the treadle and to the bar E'.

I is the filling head or cylinder, supported in the cross head or bar E. The filling-head may be made and applied in any well-known or suitable way.

J is the plunger, which passes freely through the head or cylinder I, as is clearly indicated in Fig. 2.

K is a dog, hinged to the lower end of the plunger, and so supported as to be incapable of dropping below or out of a horizontal position, but capable of being swung to a vertical position. To support the dog K in this manner, and admit of its being swung to a vertical position, I deem it best to slot the lower end of the plunger, as shown at *a*, and to arrange the dog in the said slot and to retain it there by means of a pin, *a'*, passing freely through the dog, as is clearly indicated in Figs. 3 and 4; but, as the manner of connecting the dog to the plunger may be varied without altering the result desired, I do not here intend to restrict myself to the precise way herein shown and described of hinging the dog to the plunger. The outer end or point of the dog should, by preference, stand a very little way above the remaining part when the dog rests in its horizontal position. I also deem it best to bevel the lower edge of the dog and the lower end of the plunger, substantially as shown; but it is not absolutely essential that these parts should be so beveled. To prevent leakage the plunger should either pass through a small chamber containing stuffing, as shown at *b*, or be packed by means of leather or other suitable material applied directly upon the plunger. If any suitable handle—L, for example—be applied to the plunger, it will render it capable of being used with facility for the purpose for which it is intended; but as machines for filling bottles with gaseous liquors are commonly provided with a lever for working the plunger, I have also shown the plunger connected to such a lever, as will be observed by referring to Fig. 1, in which M represents the lever referred to, and N an arm applied to the head or cylinder I, and connected to the said lever by means of a vibrating arm, O.

P is a nut for securing the arm N to the head I, and Q is a screw-cap for the stuffing box or chamber.

S is a forked head run upon the upper end of the plunger, and jointed to the lever M.

T is a bottle, and U is an internal bottle-stopper having a loop-shaped stem, V.

The operation of the machine is as follows: The bottle to be filled is placed upon the table or bench, as indicated in Fig. 1. The treadle is then depressed, and this act brings the filling head or cylinder down upon the bottle, as shown in Fig. 2, the stopper being left open. The bottle is then filled in the usual manner. After the bottle has been filled the plunger is pushed downward. As the plunger descends, the lower edge of the dog K strikes the upper end of the loop V and is swung or tilted upward into the slot $a$, and there held by its contact with the loop until the plunger passes down far enough to carry the dog below the upper end of the loop, when the dog falls out into a horizontal position and is ready to engage the loop when the plunger is drawn up. If the plunger be now drawn up, the stopper will be drawn to its closed position and will be there held either automatically or by the gas in the bottle. If the plunger be again pushed down a little way and the treadle released, the bottle may be removed. A spring may be employed, if deemed best, to aid the dog in falling to its horizontal position; but the jar consequent upon working the machine will under ordinary circumstances render such a spring unnecessary, especially if the dog is pivoted off its center of gravity in the manner shown.

I do not here claim as my invention any features of construction not relating to the plunger and its pivoted dog; but,

Having thus described my invention, what I claim as new, and desire to secure by Letters Patent, is—

The combination, with the filling-head of a bottling-machine, of a stopper-closing plunger having on its lower end a pivoted dog, adapted to operate substantially as and for the purposes specified.

RICHARD OTTEN.

Witnesses:
F. F. WARNER,
H. FRANKFURTER.